United States Patent
Wu et al.

(10) Patent No.: US 10,800,551 B2
(45) Date of Patent: Oct. 13, 2020

(54) HIGH CAPACITY COMMUNICATION SATELLITE

(71) Applicant: Space Systems/Loral, LLC, Palo Alto, CA (US)

(72) Inventors: Gordon Wu, Lafayette, CO (US); Philip Alley, Mountain View, CA (US); David Marlow, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 325 days.

(21) Appl. No.: 15/887,721

(22) Filed: Feb. 2, 2018

(65) Prior Publication Data

US 2018/0370657 A1    Dec. 27, 2018

Related U.S. Application Data

(60) Provisional application No. 62/523,186, filed on Jun. 21, 2017.

(51) Int. Cl.
*B64G 1/10*   (2006.01)
*B64G 1/00*   (2006.01)
(Continued)

(52) U.S. Cl.
CPC ........... *B64G 1/007* (2013.01); *B64G 1/1007* (2013.01); *B64G 1/222* (2013.01); *B64G 1/242* (2013.01);
(Continued)

(58) Field of Classification Search
CPC ................................. B64G 1/10; B64G 1/007
See application file for complete search history.

(56) References Cited

U.S. PATENT DOCUMENTS 3,978,490 A    8/1976   Fletcher
5,451,975 A    9/1995   Miller et al.
(Continued)

FOREIGN PATENT DOCUMENTS

EP    0825677    2/1998

OTHER PUBLICATIONS

Harris, "Unfurlable Mesh Reflector Antennas," 2017 Harris Corporation, Aug. 2017, 5 pages.
(Continued)

*Primary Examiner* — Nicholas McFall
*Assistant Examiner* — Terri L Filosi
(74) *Attorney, Agent, or Firm* — Weaver Austin Villeneuve & Sampson LLP

(57) ABSTRACT

A spacecraft includes a structural interface adapter for mating to a launch vehicle, an aft surface disposed proximate thereto, and a forward surface disposed opposite thereto, a main body structure, including a plurality of sidewalls, disposed between the aft surface and the forward surface and a plurality of unfurlable antenna reflectors. At least one unfurlable antenna reflector is configured to be illuminated, in an on-orbit configuration, by a respective feed array. The spacecraft is reconfigurable from a launch configuration to the on-orbit configuration. In the launch configuration, the at least one unfurlable antenna reflector is disposed, undeployed, forward of the respective feed array, proximate to and outboard of one of the plurality of sidewalls. In the on-orbit configuration, the forward surface is substantially earth-facing and the at least one unfurlable antenna reflector is disposed, deployed, so as to be earth-facing from a position aft of the respective feed array.

20 Claims, 4 Drawing Sheets

(51) Int. Cl.
  *H01Q 1/28* (2006.01)
  *B64G 1/22* (2006.01)
  *H01Q 1/08* (2006.01)
  *B64G 1/66* (2006.01)
  *H01Q 15/16* (2006.01)
  *B64G 1/24* (2006.01)
  *B64G 1/64* (2006.01)

(52) U.S. Cl.
  CPC .............. *B64G 1/641* (2013.01); *B64G 1/66* (2013.01); *H01Q 1/087* (2013.01); *H01Q 1/288* (2013.01); *H01Q 15/161* (2013.01)

(56) References Cited

U.S. PATENT DOCUMENTS

| | | |
|---|---|---|
| 5,885,906 A | 3/1999 | Reynolds et al. |
| 6,384,800 B1 | 5/2002 | Bassily et al. |
| 8,448,902 B2 | 5/2013 | Gelon |
| 8,487,830 B2* | 7/2013 | Texier ................... H01Q 1/288 343/881 |
| 8,789,796 B2 | 7/2014 | Boccio et al. |
| 9,004,409 B1 | 4/2015 | Baghdasarian |
| 9,248,922 B1 | 2/2016 | Baghdasarian et al. |
| 2008/0143636 A1* | 6/2008 | Couchman ............... B64G 1/66 343/915 |
| 2012/0068019 A1 | 3/2012 | Boccio et al. |
| 2012/0205492 A1* | 8/2012 | Gelon .................. B64G 1/1007 244/171.8 |
| 2014/0097981 A1 | 4/2014 | Celerier |
| 2016/0264264 A1 | 9/2016 | Helmer et al. |

OTHER PUBLICATIONS

Extended European Search Report dated Oct. 24, 2018 in EP Application No. 18178440.6.

* cited by examiner

View D1

View D2

View E1

View E2

View F1

View F2

HIGH CAPACITY COMMUNICATION SATELLITE

CROSS-REFERENCE TO RELATED APPLICATIONS

This disclosure claims priority to U.S. Provisional Patent Application No. 62/523,186 filed Jun. 21, 2017, entitled "HIGH CAPACITY BROADBAND SATELLITE", and assigned to the assignee hereof, the disclosure of which is hereby incorporated by reference in its entirety into this Patent Application for all purposes.

TECHNICAL FIELD

This invention relates generally to a spacecraft, and particularly to a high capacity broadband spacecraft having multiple large unfurlable antennas.

BACKGROUND

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beans operable capable of providing at least 400 Gbps total data bandwidth distributed across at least one hundred spot beams.

A spacecraft configuration appropriate to such a demand may be required to accommodate several unfurlable antenna reflectors, each having a diameter, when in an on-orbit (unfurled) configuration of 5-10 meters.

Launch vehicle compatibility is a second requirement faced by a spacecraft designer. The increased performance requirements are only advantageously met if compatibility with a conventional, commercially available launch vehicle is preserved. As a result, it is very often a requirement to reconfigure a spacecraft from a launch configuration to an on-orbit configuration. Some techniques related to this requirement are disclosed in U.S. Pat. Nos. 8,789,796 and 8,448,902, 9,248,922 and 9,004,409, assigned to the assignee of the present disclosure, and in U.S. patent application Ser. No. 15/160,258, assigned to the assignee of the present disclosure, the disclosures of which are hereby incorporated by reference into the present disclosure in their entirety for all purposes.

There is a need for further improvements enabling even higher throughput spacecraft than those contemplated by the above mentioned references.

SUMMARY

According to some implementations, a spacecraft includes a structural interface adapter for mating to a launch vehicle, an aft surface disposed proximate to the structural interface adapter, a forward surface disposed opposite to the aft surface and the forward surface, the main body structure including a plurality of sidewalls disposed between the aft surface and the forward surface, and a plurality of unfurlable antenna reflectors, at least one unfurlable antenna reflector configured to be illuminated, in an on-orbit configuration, by a respective feed array. The spacecraft is reconfigurable from a launch configuration to the on-orbit configuration. In the launch configuration, the at least one unfurlable antenna reflector is disposed, undeployed, forward of the respective feed array, proximate to and outboard of one of the plurality of sidewalls. In the on-orbit configuration, the spacecraft is disposed with the forward surface being substantially earth-facing and the at least one unfurlable antenna reflector is disposed, deployed, so as to be earth-facing from a position aft of the respective feed array.

In some examples, in the launch configuration, a substantial portion of the at least one unfurlable antenna reflector may be disposed aft of the forward surface.

In some examples, in the on-orbit configuration, the at least one unfurlable antenna reflector may be illuminated by the respective feed array.

In some examples, the respective feed array may be an active phased array of radiating elements.

In some examples, the respective feed array may be disposed proximate to the aft surface.

In some examples, each unfurlable antenna reflector may be articulably linked with the main body structure by way of a respective deployment boom.

In some examples, the spacecraft may further include a rigid antenna reflector and a solar array and the spacecraft may be configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The plurality of sidewalls may include, orthogonal to the roll axis, an east sidewall and a west sidewall, and, orthogonal to the pitch axis, a north sidewall and a south sidewall. Each of the solar array and the rigid reflector may be disposed, in the on-orbit configuration, proximate to one of the north sidewall and the south sidewall, the rigid reflector being forward of the solar array.

In some examples, the rigid reflector may be disposed, in the launch configuration, such that an aperture plane of the rigid reflector is approximately orthogonal to the forward surface.

According to some implementations, a spacecraft includes a structural interface adapter for mating to a launch vehicle, an aft surface disposed proximate to the structural interface adapter, a forward surface disposed opposite to the aft surface, a main body structure disposed between the aft surface and the forward surface, the main body structure including a plurality of sidewalls disposed between the aft surface and the forward surface, and at least three antenna subsystems, each antenna subsystem including an unfurlable antenna reflector. The spacecraft is reconfigurable from a launch configuration to an on-orbit configuration. Each antenna system is disposed, undeployed, such that, in the launch configuration, the unfurlable antenna reflector is forward of a respective feed array, proximate to and outboard of one of the plurality of sidewalls; and, in the on-orbit configuration, the unfurlable antenna reflector configured to be illuminated by the, respective feed array. In the on-orbit configuration, the spacecraft is disposed with the forward surface being substantially earth-facing and each unfurlable antenna reflector is disposed, deployed, so as to be earth-facing from a position aft of the aft surface.

In some examples, in the launch configuration, a substantial portion of each unfurlable reflector may be disposed aft of the forward surface.

In some examples, each feed array may be an active phased array of radiating elements.

In some examples, each feed array may be disposed proximate to the aft surface.

In some examples, each antenna reflector may be articulably linked with the main body structure by way of a respective deployment boom.

In some examples, the spacecraft may further include a rigid antenna reflector and a solar array. The spacecraft may be configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The plurality of sidewalls may include, orthogonal to the roll axis, an east sidewall and a west sidewall, and, orthogonal to the pitch axis, a north sidewall and a south sidewall. Each of the solar array and the rigid reflector may be disposed, in the on-orbit configuration, proximate to one of the north sidewall and the south sidewall, the rigid reflector being forward of the solar array.

In some examples, the rigid reflector may be disposed, in the launch configuration, such that an aperture plane of the rigid reflector is approximately orthogonal to the forward surface.

According to some implementations, a method includes reconfiguring a spacecraft from a launch configuration to an on-orbit configuration. The spacecraft includes a structural interface adapter for mating to a launch vehicle, an aft surface disposed proximate to the structural interface adapter, a forward surface disposed opposite to the aft surface, a main body structure disposed between the aft surface and the forward surface, the main body structure including a plurality of sidewalls disposed between the aft surface and the forward surface, an unfurlable antenna reflector and an associated feed array. In the on-orbit configuration, the spacecraft is disposed with the forward surface being substantially earth-facing; and reconfiguring includes repositioning the unfurlable antenna reflector from an undeployed position to a deployed position, the undeployed position being forward of the respective feed array, proximate to and outboard of one of the plurality of sidewalls and the deployed position being earth-facing from a position aft of the associated feed array and illuminating the unfurlable antenna reflector with the associated feed array.

In some examples, in the launch configuration, a substantial portion of the unfurlable antenna reflector may be disposed aft of the forward surface.

In some examples, in the on-orbit configuration, the unfurlable antenna reflector may be illuminated by the associated feed array.

In some examples, the associated feed array may be an active phased array of radiating elements.

In some examples, the associated feed array may be disposed proximate to the aft surface.

BRIEF DESCRIPTION OF THE DRAWINGS

Features of the invention are more fully disclosed in the following detailed description, reference being had to the accompanying drawings, in which like reference numerals designate like elements, and in which.

Figure 1:
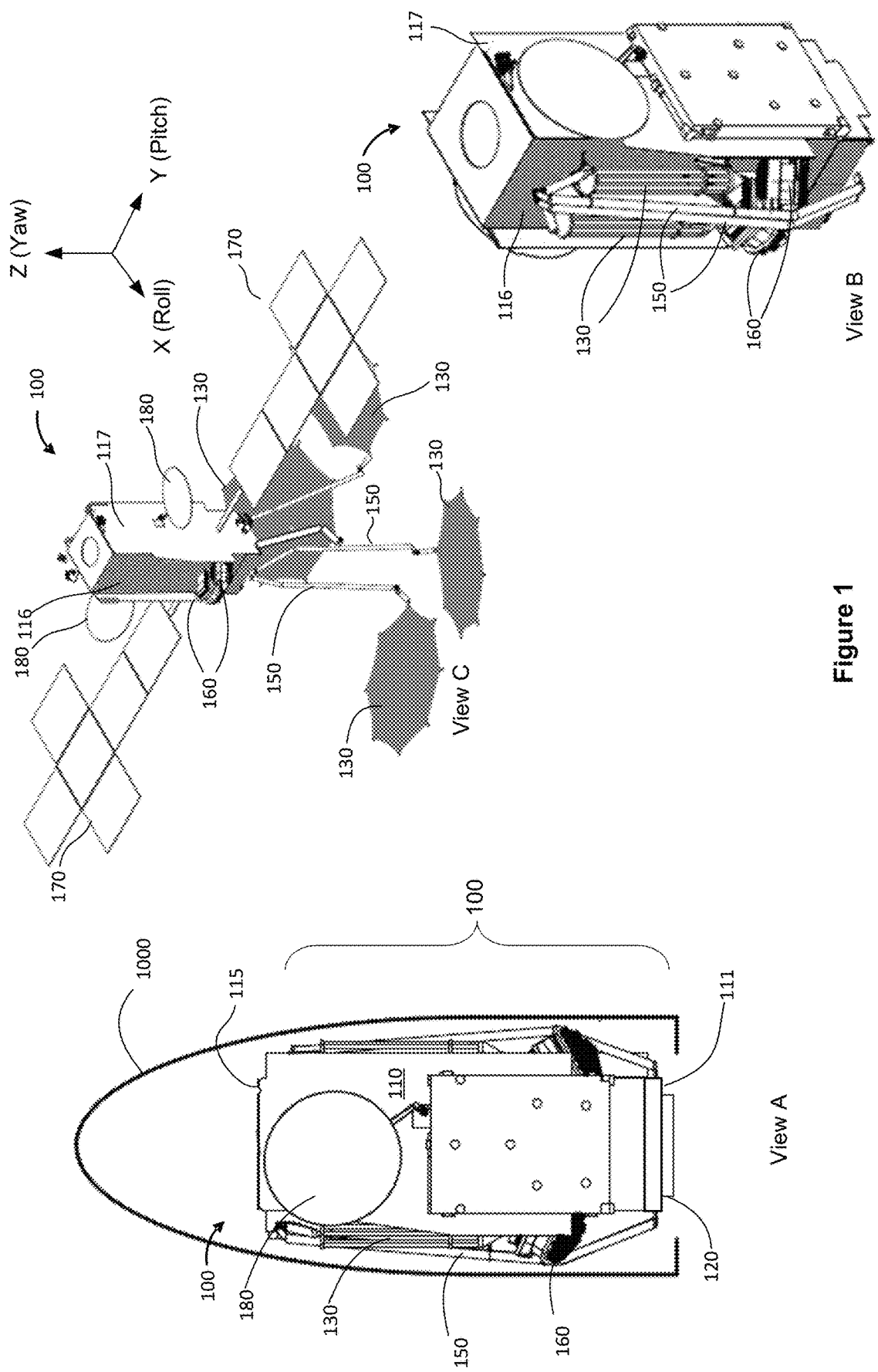
FIG. 1 illustrates an example of a high capacity broadband satellite in accordance with an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present inventors have recognized that a high capacity broadband service, providing a data capacity of at least 400 Gbps, may be achieved from an Earth orbiting spacecraft having a payload that includes multiple large unfurlable antenna reflectors, each antenna reflector, illuminated, in an on-orbit configuration, by a respective feed array. Some or all of the feed arrays may be active phased arrays of radiating elements. The spacecraft, which includes a structural interface adapter for mating to a launch vehicle, an aft surface disposed proximate to the structural interface adapter, a forward surface disposed opposite to the aft surface, and a main body structure disposed between the aft surface and the forward surface, is reconfigurable from a launch configuration to the on-orbit configuration. In the launch configuration, unfurlable antenna reflectors are disposed, in an undeployed (furled) configuration, forward of the feed arrays. At least a substantial portion of each unfurlable antenna reflector is disposed aft of the forward surface. For example, in the launch configuration an unfurlable antenna may be disposed proximate to and outboard of a sidewall of the spacecraft main body structure that extends between the aft surface and forward surface. In the on-orbit configuration, the spacecraft is disposed with the forward surface substantially Earth facing and each antenna reflector is disposed, deployed, so as to be Earth facing from a position aft of the respective feed array.

FIG. 1 illustrates an example of a high capacity broadband satellite in accordance with an implementation. Referring first to View A, an elevation view of spacecraft 100 is depicted, as configured in a launch configuration, within a launch vehicle fairing 1000. The spacecraft 100 may include a main body structure 110 disposed between and defining an aft surface 111 and a forward surface 115 opposite thereto. The aft surface 111 may be disposed proximate to a structural interface adapter 120. The structural interface adapter 120 may be configured to mate with a launch vehicle upper stage (not illustrated). In the illustrated example, the unfurlable antenna reflector 130 is disposed, in the launch configuration, undeployed, aft of the forward surface 115 and forward of a feed array 160. In some implementations, the feed array 160 may be or include an active phased array of radiating elements. As may be better observed in the perspective view of View B, the antenna reflector 130 may, in the launch configuration be furled into a compact, approximately cylindrical volume.

When deployed and unfurled (to obtain the on-orbit configuration illustrated in View C), the antenna reflector may have an effective aperture diameter of 5 meters or more and may be illuminated by a respective feed array 160. An example of an unfurlable reflector is described in US Patent No. 5,451,975, assigned to the assignee of the present invention, and in U.S. Pat. No. 3,978,490, for example. In the on-orbit configuration, with respect to an orbit plane, the spacecraft 100 has a Z (yaw) axis within the orbital plane and directed from a spacecraft coordinate system origin toward nadir (e.g., the center of Earth), a Y(pitch) axis orthogonal to the orbit plane and passing through the spacecraft coordinate system origin, and an X(roll) axis orthogonal to the pitch axis and the yaw axis and passing through the spacecraft coordinate system origin. In the illustrated configuration, the spacecraft 100 has a plurality of sidewalls including, orthogonal to the roll axis, an east (or west) sidewall 116 and, orthogonal to the pitch axis, a north (or south) sidewall 117. Solar arrays 170, in the deployed configuration extend along an axis generally parallel and proximate to the pitch axis.

In addition to the unfurlable antenna reflectors 130, in some implementations, one or more rigid antenna reflectors may be contemplated. For example, in the illustrated configuration, the spacecraft 100 includes two rigid antenna reflectors 180. Advantageously, each of the solar arrays 170 and the rigid reflectors 180 is disposed, in the on-orbit configuration, proximate to the north (or south) sidewall 117 or the oppositely disposed sidewall (not illustrated). The rigid reflector 180 may, advantageously be disposed forward of the solar array 170, so as to have a clear view of earth.

Referring again to View B, the antenna reflector 130 may be disposed, in the launch configuration, proximate to and outboard of a sidewall of the main body structure 110. For example, in the illustrated implementation, the unfurlable antenna reflectors 130 are proximate to and outboard of the sidewall 116. Each antenna reflector 130 may be articulably linked with the main body structure 110 by way of a respective deployment boom 150. The deployment boom may include one or more hinge joints configured to permit movement of the antenna reflector 130 with respect to the spacecraft. More particularly, as may be observed by comparing View B with View C, the deployment boom 150 may be configured to articulate such that the reflector 130 is caused to move from a first, undeployed location forward of its respective feed array 160, to a second, deployed location where the antenna reflector 130 is disposed so as to be Earth facing from a position aft of the respective feed array. In the deployed (on-orbit) configuration, the feed array 160 may be disposed so as to illuminate the antenna reflector 130.

In the illustrated implementation, antenna feed arrays 160 are disposed proximate to the aft surface 111 of the main body structure 110. Because the feed arrays 160 (active phased arrays) contemplated for the high capacity broadband spacecraft of the present disclosure are estimated to be approximately four times heavier than the antenna reflectors, the disclosed configuration, desirably, lowers the spacecraft center of mass compared to prior art configurations.

Figure 2:
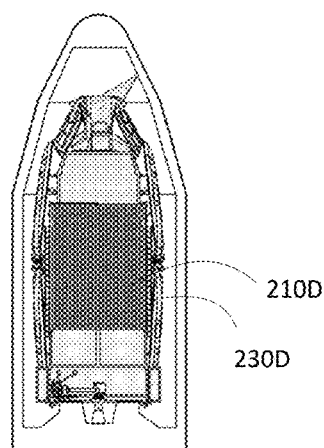
FIG. 2 illustrates examples of spacecraft arranged in the absence of the present teachings.
Figure 2:
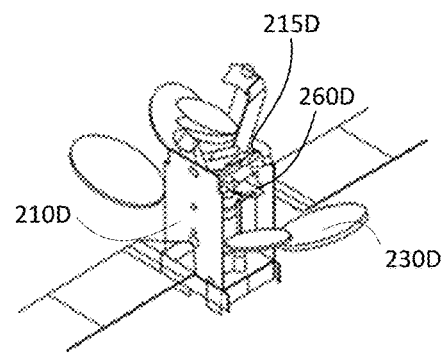
Figure 2:
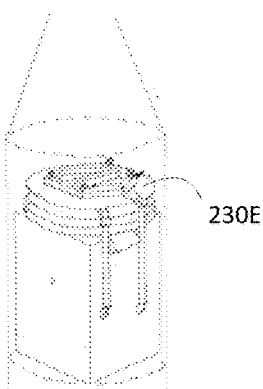
Figure 2:
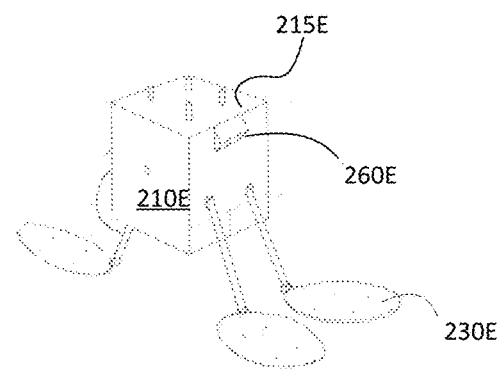
Figure 2:
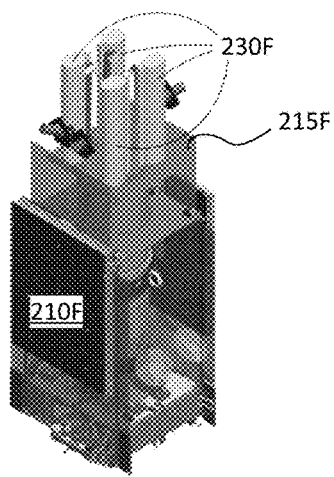
Figure 2:
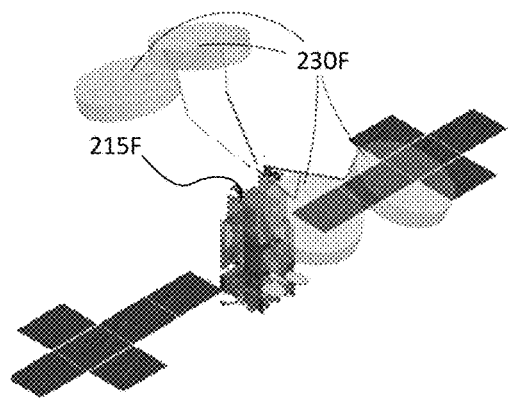

Features and benefits of the presently disclosed techniques may be better appreciated by comparing the above-described configurations with spacecraft arranged in the absence of the present teachings, as illustrated in FIG. 2. For example, View D1 and View D2 illustrate, respectively a launch configuration and an on-orbit configuration of a conventional spacecraft. In the launch configuration illustrated in View D1, rigid antenna reflectors 230D are stowed against exterior side walls of spacecraft main body structure 210D. As a consequence of this arrangement, a diameter of the antenna reflector 230D must be substantially smaller than a diameter of the launch vehicle fairing. View D2 shows the spacecraft in an on-orbit configuration in which the reflectors 230D have been deployed. Feed arrays 260D are disposed near a forward surface 215D of the main body structure 210D. In both the launch configuration and the on-orbit configuration, most or all of the reflector 230D is aft of the feed array 260D.

As a further example, Detail E1 and Detail E2 illustrate, respectively a launch configuration and an on-orbit configuration of a spacecraft described in U.S. patent application Ser. No. 15/160,258. In the launch configuration illustrated in Detail E1, rigid antenna reflectors 230E are stowed with aperture planes approximately parallel to forward surface 215E of spacecraft main body structure 210E. As a consequence of this arrangement, the rigid antenna reflectors 230E may have a diameter nearly as large as an internal diameter of the launch vehicle fairing. Detail E2 shows the spacecraft in an on-orbit configuration in which the antenna reflectors 230E have been deployed. It may be observed that feed arrays 260E are disposed near a forward surface 215E of the main body structure 210E.

As a yet further example, View F1 and View F2 illustrate, respectively a launch configuration and an on-orbit configuration of a spacecraft described in U.S. Pat. No. 8,789,796. In the launch configuration illustrated in View F1, unfurlable reflectors 230F are disposed, undeployed (furled) above forward surface 215F of spacecraft main body structure 210F. View F2 shows the spacecraft in an on-orbit configuration in which the reflectors 230F have been deployed. In both the launch configuration and the on-orbit configuration, most or all of each reflector 230F is forward of its respective feed array (not illustrated).

Figure 3:
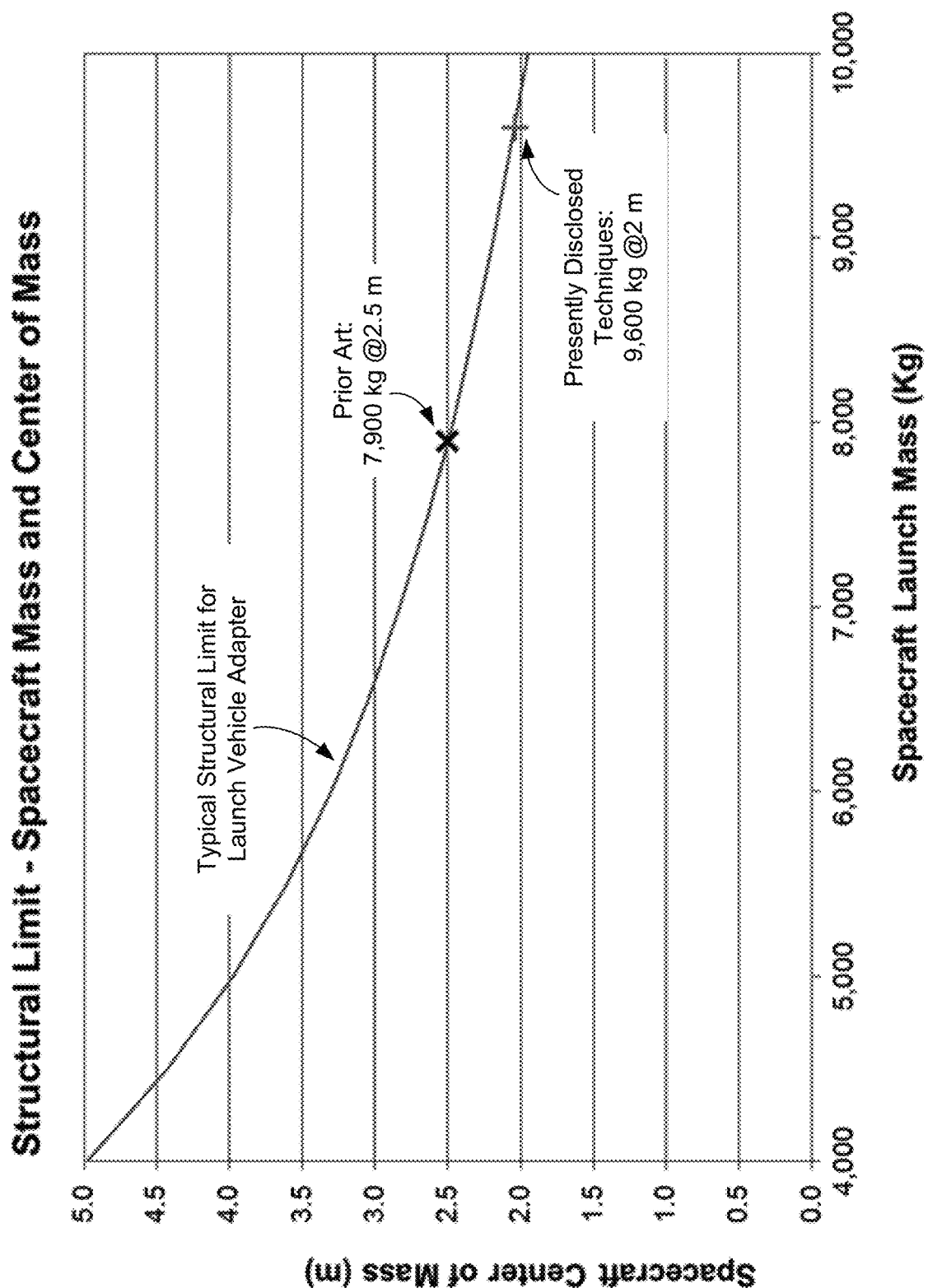
FIG. 3 illustrates a relationship between spacecraft center of mass allowable spacecraft launch

In comparison to the arrangements illustrated in FIG. 2, the presently disclosed techniques enable the location of the spacecraft center of mass to be considerably closer to the aft surface. As illustrated in FIG. 3, lowering the center of mass can directly increase the allowable spacecraft launch mass. The present inventors have found that, for the contemplated high capacity broadband satellite, which may have a total height of about 7.5 meters, the presently disclosed techniques can reduce the height of the center of mass from about 2.5 meters to about 2 meters, thereby increasing allowable spacecraft launch mass from about 7900 kg to about 9600 kg.

Figure 4:
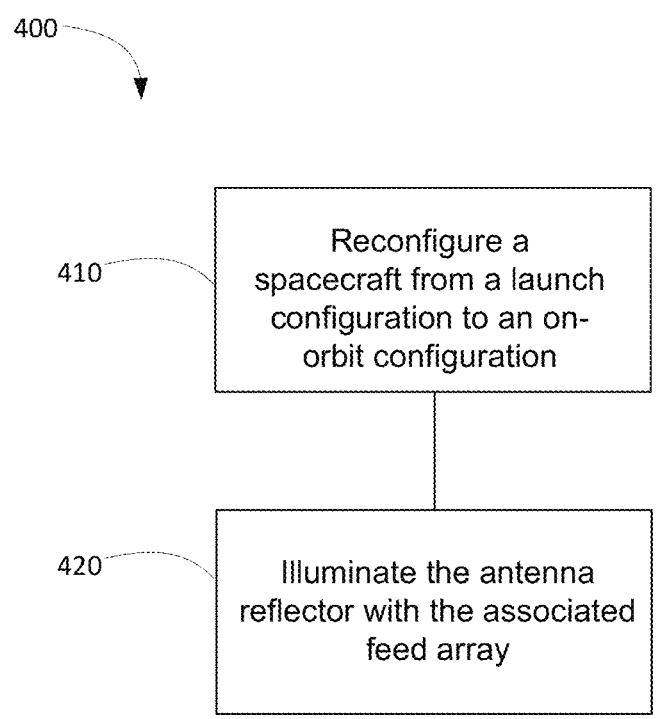
FIG. 4 illustrates a process flow diagram for reconfiguring a spacecraft from a launch configuration to an on-orbit configuration, according to an implementation mass.

FIG. 4 illustrates a process flow diagram for reconfiguring a spacecraft from a launch configuration to an on-orbit configuration. As described hereinabove the spacecraft may include a structural interface adapter for mating to a launch vehicle, an aft surface disposed proximate to the structural interface adapter, a forward surface disposed opposite to the aft surface, a main body structure disposed between the aft surface and the forward surface, the main body structure including a plurality of sidewalls disposed between the aft surface and the forward surface, and an unfurlable antenna reflector and an associated feed array. In the on-orbit configuration, the spacecraft is disposed with the forward surface being substantially earth-facing. The method 400 may start, at block 410, with reconfiguring the spacecraft from the launch configuration to the on-orbit configuration. At block 420, the antenna reflector may be illuminated with the associated feed element.

Thus, a high capacity broadband spacecraft having multiple large unfurlable antennas has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft, comprising:
   a structural interface adapter for mating to a launch vehicle;
   an aft surface disposed proximate to the structural interface adapter;
   a forward surface disposed opposite to the aft surface;
   a main body structure disposed between the aft surface and the forward surface, the main body structure including a plurality of sidewalls disposed between the aft surface and the forward surface; and
   a plurality of unfurlable antenna reflectors, at least one unfurlable antenna reflector configured to be illuminated, in an on-orbit configuration, by a respective feed array, wherein:
      the spacecraft is reconfigurable from a launch configuration to the on-orbit configuration;
      in the launch configuration, the at least one unfurlable antenna reflector is disposed, undeployed, forward of the respective feed array, proximate to and outboard of one of the plurality of sidewalls; and,
      in the on-orbit configuration, the spacecraft is disposed with the forward surface being earth-facing and the at least one unfurlable antenna reflector is disposed, deployed, so as to be earth-facing from a position aft of the respective feed array.

2. The spacecraft of claim 1, wherein, in the launch configuration, a portion of the at least one unfurlable antenna reflector is disposed aft of the forward surface.

3. The spacecraft of claim 1, wherein, in the on-orbit configuration, the at least one unfurlable antenna reflector is illuminated by the respective feed array.

4. The spacecraft of claim 1, wherein the respective feed array is an active phased array of radiating elements.

5. The spacecraft of claim 1, wherein the respective feed array is disposed proximate to the aft surface.

6. The spacecraft of claim 1, wherein each unfurlable antenna reflector is articulably linked with the main body structure by way of a respective deployment boom.

7. The spacecraft of claim 1, further comprising a rigid antenna reflector and a solar array, wherein:
   the spacecraft is configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin;
   the plurality of sidewalls includes, orthogonal to the roll axis, an east sidewall and a west sidewall, and, orthogonal to the pitch axis, a north sidewall and a south sidewall; and
   each of the solar array and the rigid antenna reflector is disposed, in the on-orbit configuration, proximate to one of the north sidewall and the south sidewall, the rigid reflector being forward of the solar array.

8. The spacecraft of claim 7, wherein the rigid reflector is disposed, in the launch configuration, such that an aperture plane of the rigid reflector is approximately orthogonal to the forward surface.

9. A spacecraft, comprising:
   a structural interface adapter for mating to a launch vehicle;
   an aft surface disposed proximate to the structural interface adapter;
   a forward surface disposed opposite to the aft surface;
   a main body structure disposed between the aft surface and the forward surface, the main body structure including a plurality of sidewalls disposed between the aft surface and the forward surface; and
   at least three antenna subsystems, each antenna subsystem including an unfurlable antenna reflector, wherein:
      the spacecraft is reconfigurable from a launch configuration to an on-orbit configuration;
      each antenna system is disposed, undeployed, such that, in the launch configuration, the unfurlable antenna reflector is forward of a respective feed array, proximate to and outboard of one of the plurality of sidewalls; and, in the on-orbit configuration, the unfurlable antenna reflector configured to be illuminated by the, respective feed array; and
      in the on-orbit configuration, the spacecraft is disposed with the forward surface being earth-facing and each unfurlable antenna reflector is disposed, deployed, so as to be earth-facing from a position aft of the aft surface.

10. The spacecraft of claim 9, wherein, in the launch configuration, a portion of each unfurlable reflector is disposed aft of the forward surface.

11. The spacecraft of claim 9, wherein each feed array is an active phased array of radiating elements.

12. The spacecraft of claim 9, wherein each feed array is disposed proximate to the aft surface.

13. The spacecraft of claim 9, wherein each antenna reflector is articulably linked with the main body structure by way of a respective deployment boom.

14. The spacecraft of claim 9, further comprising a rigid antenna reflector and a solar array, wherein:
   the spacecraft is configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin;

the plurality of sidewalls includes, orthogonal to the roll axis, an east sidewall and a west sidewall, and, orthogonal to the pitch axis, a north sidewall and a south sidewall; and each of the solar array and the rigid antenna reflector is disposed, in the on-orbit configuration, proximate to one of the north sidewall and the south sidewall, the rigid reflector being forward of the solar array.

15. The spacecraft of claim 14, wherein the rigid reflector is disposed, in the launch configuration, such that an aperture plane of the rigid reflector is approximately orthogonal to the forward surface.

16. A method comprising:

reconfiguring a spacecraft from a launch configuration to an on-orbit configuration; wherein:

the spacecraft includes a structural interface adapter for mating to a launch vehicle, an aft surface disposed proximate to the structural interface adapter, a forward surface disposed opposite to the aft surface, a main body structure disposed between the aft surface and the forward surface, the main body structure including a plurality of sidewalls disposed between the aft surface and the forward surface, an unfurlable antenna reflector and an associated feed array;

in the on-orbit configuration, the spacecraft is disposed with the forward surface being earth-facing; and reconfiguring includes:

repositioning the unfurlable antenna reflector from an undeployed position to a deployed position, the undeployed position being forward of the respective feed array, proximate to and outboard of one of the plurality of sidewalls and the deployed position being earth-facing from a position aft of the associated feed array; and illuminating the unfurlable antenna reflector with the associated feed array.

17. The method of claim 16, wherein, in the launch configuration, a portion of the unfurlable antenna reflector is disposed aft of the forward surface.

18. The method of claim 16, wherein, in the on-orbit configuration, the unfurlable antenna reflector is illuminated by the associated feed array.

19. The method of claim 16, wherein the associated feed array is an active phased array of radiating elements.

20. The method of claim 16, wherein the associated feed array is disposed proximate to the aft surface.

* * * * *